(12) United States Patent
Takezawa

(10) Patent No.: US 6,239,923 B1
(45) Date of Patent: May 29, 2001

(54) LENS BARREL HAVING AN IRIS STOP UNIT

(75) Inventor: Kazumitsu Takezawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/384,343

(22) Filed: Aug. 27, 1999

(30) Foreign Application Priority Data

Aug. 31, 1998 (JP) ................................................. 10-259147

(51) Int. Cl.[7] ..................................................... G02B 9/00
(52) U.S. Cl. ............................................ 359/739; 359/738
(58) Field of Search .................................. 359/819, 738, 359/739, 740; 396/510

(56) References Cited

U.S. PATENT DOCUMENTS

| 4,199,247 | * | 4/1980 | Schwarz | 396/510 |
|---|---|---|---|---|
| 4,504,134 | * | 3/1985 | Schlapp et al. | 396/509 |
| 4,897,682 | * | 1/1990 | Kuwana | 396/510 |
| 5,923,913 | * | 7/1999 | O'Brien et al. | 396/510 |
| 5,993,079 | * | 11/1999 | O'Brien et al. | 396/508 |
| 5,997,187 | * | 12/1999 | Hamasaki | 396/449 |
| 6,161,966 | * | 12/2000 | Chang et al. | 396/508 |

* cited by examiner

*Primary Examiner*—Georgia Epps
*Assistant Examiner*—Saeed Seyrafi

(57) ABSTRACT

A lens barrel including an iris stop unit which is easily secured in the lens barrel. The lens barrel includes a lens group holding frame fixed by screws to a moving tube which holds a lens group in a manner freely slidable in a forward or backward direction. A support ring is formed integrally with the moving tube, and the support ring, along with blades and a drive ring forms an iris stop unit. The blades and the drive ring are set at a designated position and the lens group holding frame is inserted into the moving tube and connected by screws. The drive ring is held by the front end of the lens group holding frame.

16 Claims, 5 Drawing Sheets

LENS BARREL HAVING AN IRIS STOP UNIT

CROSS-REFERENCE TO RELATED APPLICATIONS

This application is based upon and claims priority of Japanese Patent Application No. 10-259147 filed Aug. 31, 1998, the contents being incorporated herein by reference.

BACKGROUND OF THE INVENTION

1. Field of the Invention

The present invention relates to a lens barrel which is mounted onto a camera body, and, more particularly, the present invention relates to a lens barrel having an iris stop unit having a support ring, blades and a drive ring, wherein the blades and the drive ring are secured to the d support ring using a lens group holding frame.

2. Description of the Related Art

Various types of lens barrels which are mountable on a camera body are known. The known types of lens barrels which are mountable on a camera body include single-focal-length lenses and zoom lenses ranging from wide-angle lenses to telephoto lenses. A lens barrel having a plurality of lens groups, which comprise one or multiple optical lens elements, can obtain accurate focusing by varying the relative distance between each lens group. Moreover, a type of lens barrel is known which incorporates exposure and depth of focus control in the lens barrel, and includes an aperture stop device built into the lens barrel to control the volume of light flux. Presently, the most prevailing aperture stop device is an iris stop unit which consists of a plurality of blades arranged diametrally. The iris stop unit controls a numerical aperture by moving the plurality of blades.

The conventional iris stop unit includes several blades, a support ring which supports the blades in a freely pivotable manner, and a drive ring having a cam which makes the blades pivot. The blades are pivoted by rotating the drive ring. The drive ring may be rotated by manually rotating an aperture ring arranged in an external surface of the lens barrel. However, in autofocus lens barrels, the drive ring is rotated by the drive control system of a camera body through an aperture stop coupling lever.

The conventional iris stop unit is fixed to a lens group holding frame (fixed tube or moving tube) using a fixing ring having a male screw on its external surface, or using a fixing ring having a perforated hole. The support ring of the iris stop unit may either be separated from the supporting parts for the lens group holding frame, or built onto the supporting parts for the lens group holding frame.

The conventional lens barrel which uses a fixing ring to fix an iris stop unit results in the problems of increased process time and an increased number of parts. For example, when a fixing ring with a male screw cut on its external surface is used to secure the iris stop unit, a female screw must be cut on the internal surface of the supporting parts for the lens group holding frame. Further, a special tool is required to turn the fixing ring around. Furthermore, if the fixing ring with a perforated hole is used to secure the iris stop unit, it becomes necessary not only to bore a threaded hole, but also to fasten multiple (nonnally more than three) screws with a screw driver. Thus, the number of parts and the process time required to fix the iris stop unit increases.

SUMMARY OF THE INVENTION

It is an object of the present invention to provide a lens barrel including an iris stop unit which is easily secured in the lens barrel.

Objects and advantages of the present invention are achieved in accordance with embodiments of the present invention with a lens barrel having an iris stop unit comprising a support ring, a freely pivotable blade arranged behind or in front of the support ring, a drive ring arranged behind or in front of the blade to pivot the blade, and a lens group holding frame to secure the blade and the drive ring to the support ring in a manner to assure the intended movements.

In accordance with embodiments of the present invention, it is not necessary to cut a female screw and to bore a threaded hole in the supporting member for a lens group holding frame. Further, a fixing ring and screws become unnecessary, since the lens group holding frame performs the function of a fixing ring.

In accordance with embodiments of the present invention, the support ring and the drive ring may be coupled such that the support ring and drive ring cannot be removed from the lens barrel, except when arranged at a predetermined relative angle.

In accordance with embodiments of the present invention, the iris stop unit eliminates or reduces a possibility of detachment or drop off of the blades or the drive ring by placing the drive ring with respect to the support ring at a position deviated from the predetermined relative angle when assembling the iris stop unit to the supporting parts for the lens group holding frame.

In accordance with embodiments of the present invention, the lens barrel further comprises an impetus device to provide an impetus to the drive ring in a direction deviated from the determined relative angle.

In accordance with embodiments of the present invention, the iris stop unit eliminates or reduces the possibility of detachment or drop off of blades or the drive ring when inserting the iris stop unit into the supporting member for the lens group holding frame, since the drive ring is placed at the position deviated from the predetermined relative angle.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
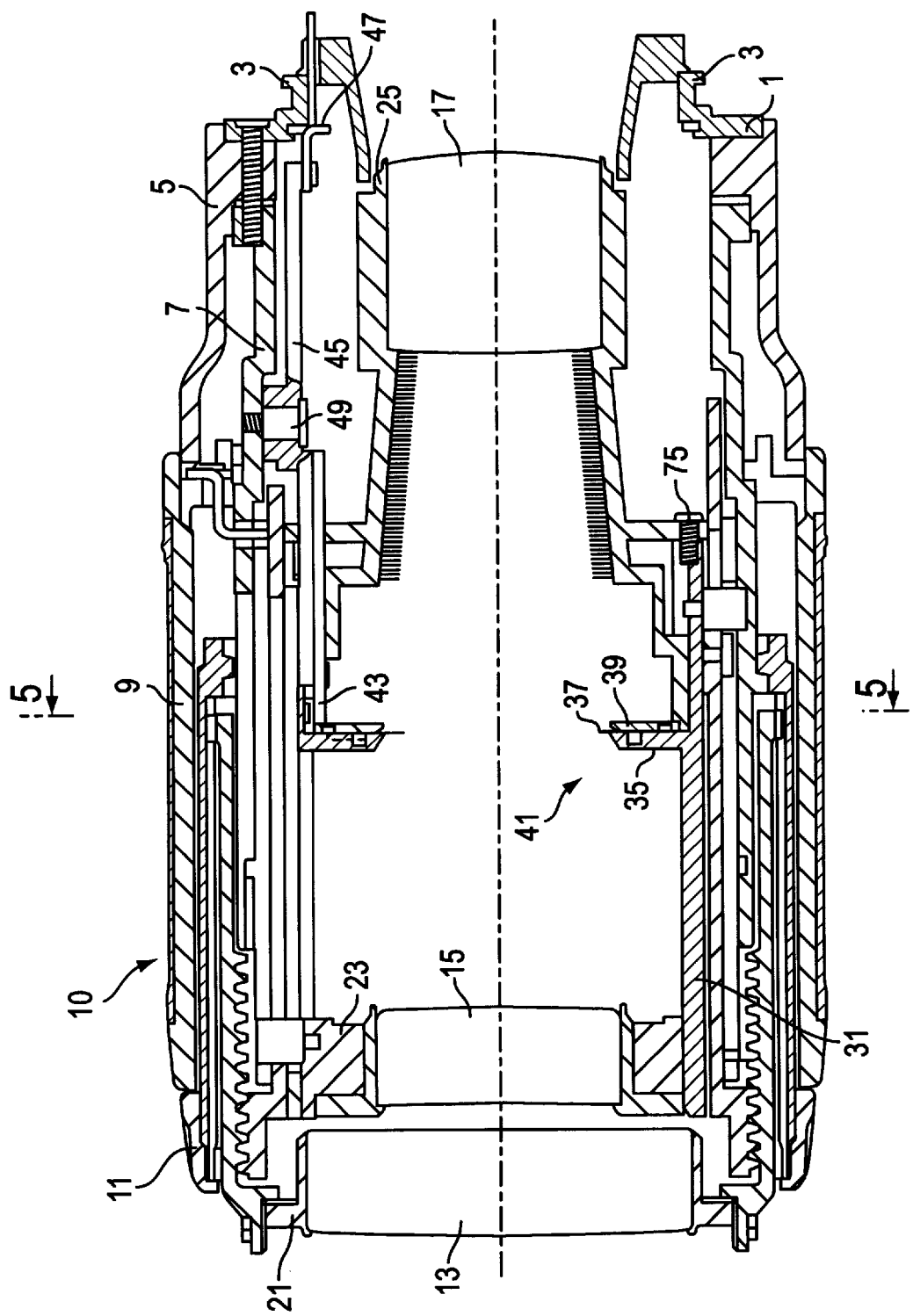
FIG. 1 is a lengthwise sectional view of a lens barrel in accordance with embodiments of the present invention.

Reference will now be made in detail to the preferred embodiments of the present invention, examples of which are illustrated in the accompanying drawings, wherein like reference numerals refer to like elements throughout.

FIG. 1 is a cross-sectional view of a lens barrel having an iris stop unit in accordance with embodiments of the present invention. As shown in FIG. 1, the lens barrel 10 includes a ring-formed fixing mount 1 in which a plurality of external surface bayonet lugs 3 are formed for mounting the lens barrel 10 onto a camera body (not shown). An external fixing tube 5 and an internal fixing tube 7 are tightly fixed to the fixing mount 1 by screws. A zoom ring 9 and a focusing ring 11 are fixed to the front part of the external fixing tube 5 in a freely rotatable manner. By rotating the zoom ring 9 clockwise or counterclockwise, first, second and third lens group holding frames 21, 23, 25 which hold corresponding first, second and third lens groups 13, 15, 17 move forward or backward. By rotating the focusing ring 11 clockwise or counterclockwise, the first lens group 13 alone moves forward or backward. The lens barrel also includes a zoom cam device (not shown) and a focus cam device (not shown). Because the zoom cam device and the focus cam device are not directly related to the present invention, a description of these elements is omitted.

The third lens group holding frame 25 is fixed by screws to a moving tube 31. The moving tube 31 holds the second lens group holding frame 23 in a manner such that the second lens group holding frame 23 is freely slidable in a forward or backward direction. Thus, the moving tube 31 is a supporting member for the lens group holding frames 23 and 25. In accordance with embodiments of the present invention, a support ring 35 is integrally formed with the moving tube 31. An iris stop unit 41 comprises the support ring 35, along with blades 37 and a drive ring 39. An aperture stop rod 43 is implanted in a back surface of the drive ring 39, is coupled with the camera's aperture stop drive control (not shown) through an aperture stop coupling lever 45 fixed to the internal fixing tube 7 and an aperture stop coupling ring 47 fixed to the fixing mount 1. A support pin 49 is provided for supporting the aperture stop coupling lever 45.

Figure 2:
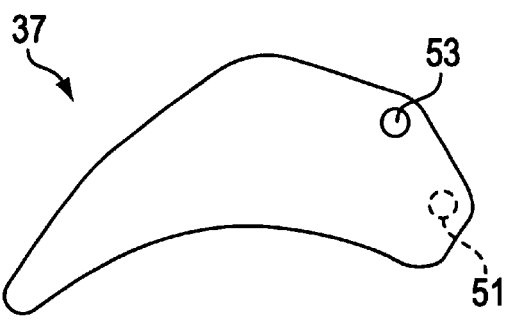
FIG. 2 is a rear view of an iris blade in accordance with embodiments of the present invention.

FIG. 2 is a rear view of an iris blade 37 of the iris stop unit 41 in accordance with embodiments of the present invention.

As shown in FIG. 2, the iris blade 37 comprises a thin metal plate punched into a nearly meniscus shape. The blade 37 includes an implanted pivot pin 51 in a back surface, and a follower pin 53 in a front surface at a base end area.

Figure 3:
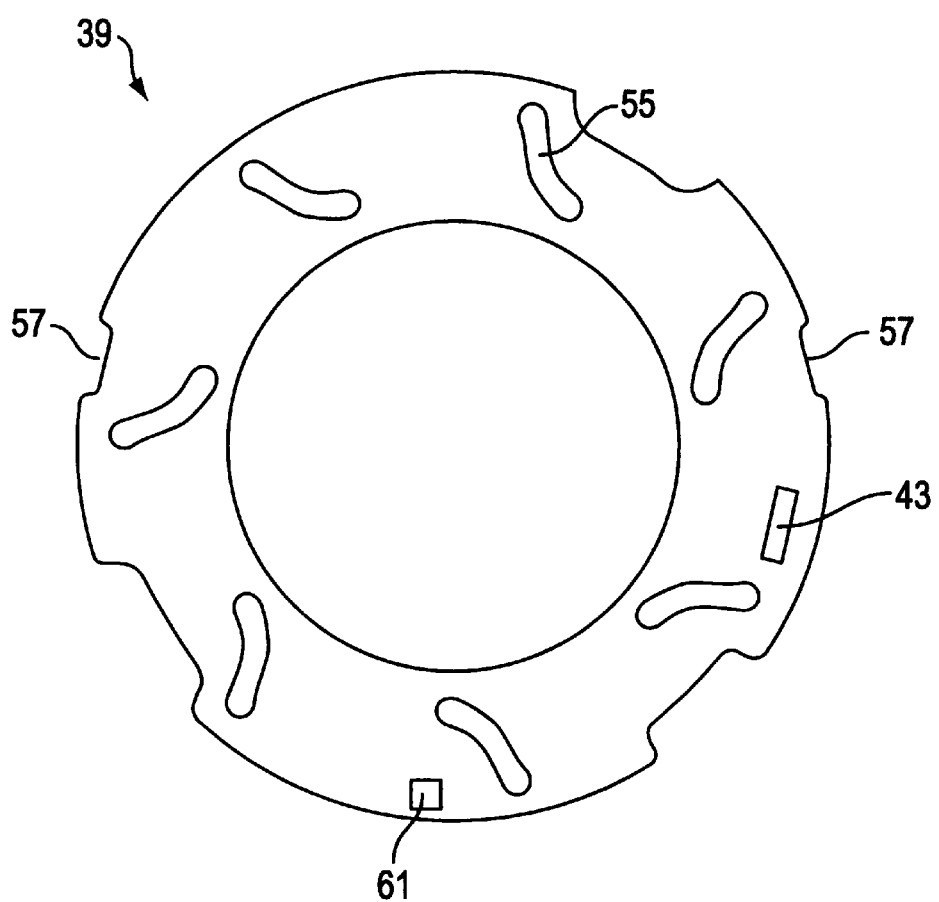
FIG. 3 is a rear view of a drive ring in accordance with embodiments of the present invention.

FIG. 3 is a rear view of the drive ring 39 in accordance with embodiments of the present invention. As shown in FIG. 3, the drive ring 39 is doughnut shaped, and is preferably formed of injection molded plastic. Seven cam grooves 55 are arranged radially on the drive ring 39 formed at equiangular intervals, and two assembly recesses 57 are formed on the external circumference. The drive ring 39 also includes a spring stop boss 61 built up in the back surface of the drive ring 39.

Figure 4:
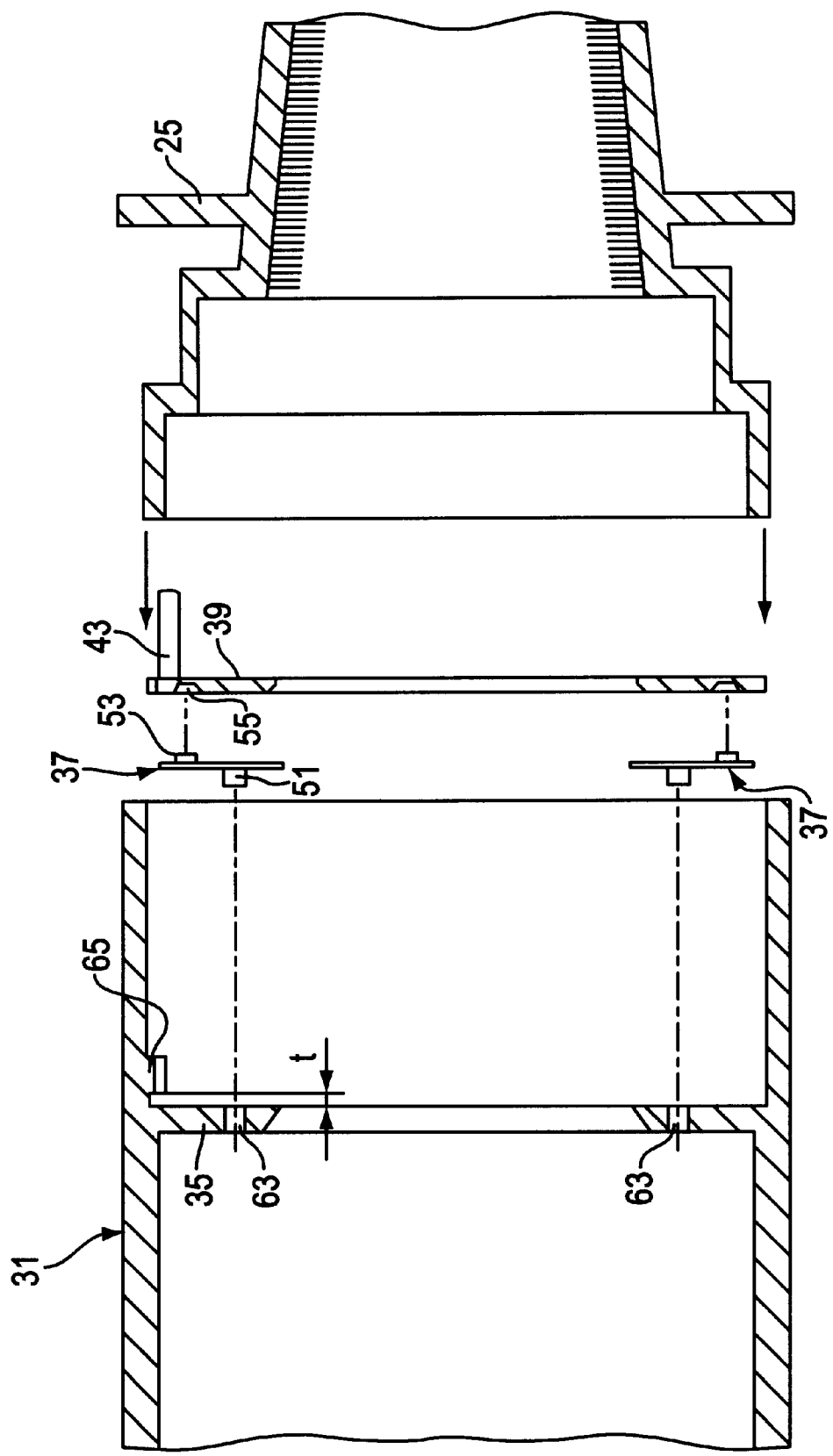
FIG. 4 is a view illustrating assembly of the iris stop unit in accordance with embodiments of the present invention.
Figure 5:
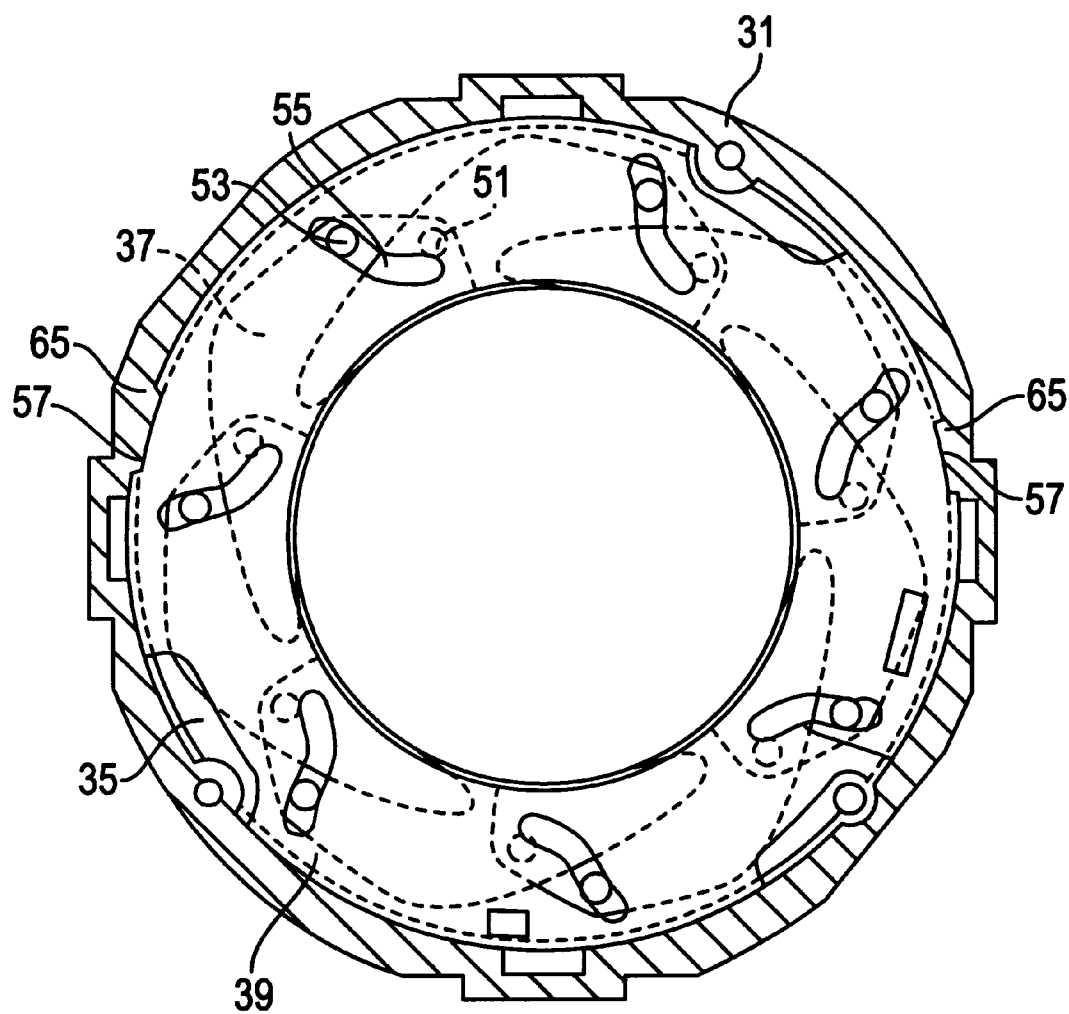
FIG. 5 is a sectional view of the iris stop unit in an open state taken along the 5—5 sectional line in FIG. 1 in accordance with embodiments of the present invention.

An assembly process of the iris stop unit 41 in accordance with embodiments of the present invention will now be described below with reference to FIGS. 4–6. As shown in FIG. 4, pivot holes 63, which correspond to the pivot pins 51 on the blade 37, are formed in the support ring 35. Two lugs 65 (e.g., projections) are formed on the internal surface of the moving tube 31, behind the support ring 35 with a given clearance t. In accordance with embodiments of the present invention, to assemble the iris stop unit 41, the blades 37 are first inserted into the moving tube 31, then the pivot pins 51 of the blades 37 are fitted into pivot holes 63 of the support ring 35. Next, as shown in FIG. 5 (5—5 section of FIG. 1), the blades 37 are set at the full open position and the drive ring 39 is inserted into the moving tube 31. In this condition, the lugs 65 of the moving tube 31 and the assembly recesses 57 of the drive ring 39 are in the same phase. Therefore, the drive ring 39 is pressed against the blades 37 such that the drive ring 39 closely contacts with the blades 37, and the follower pins 53 of the blades 37 fit into cam grooves 55 of the drive ring 39.

Figure 6:
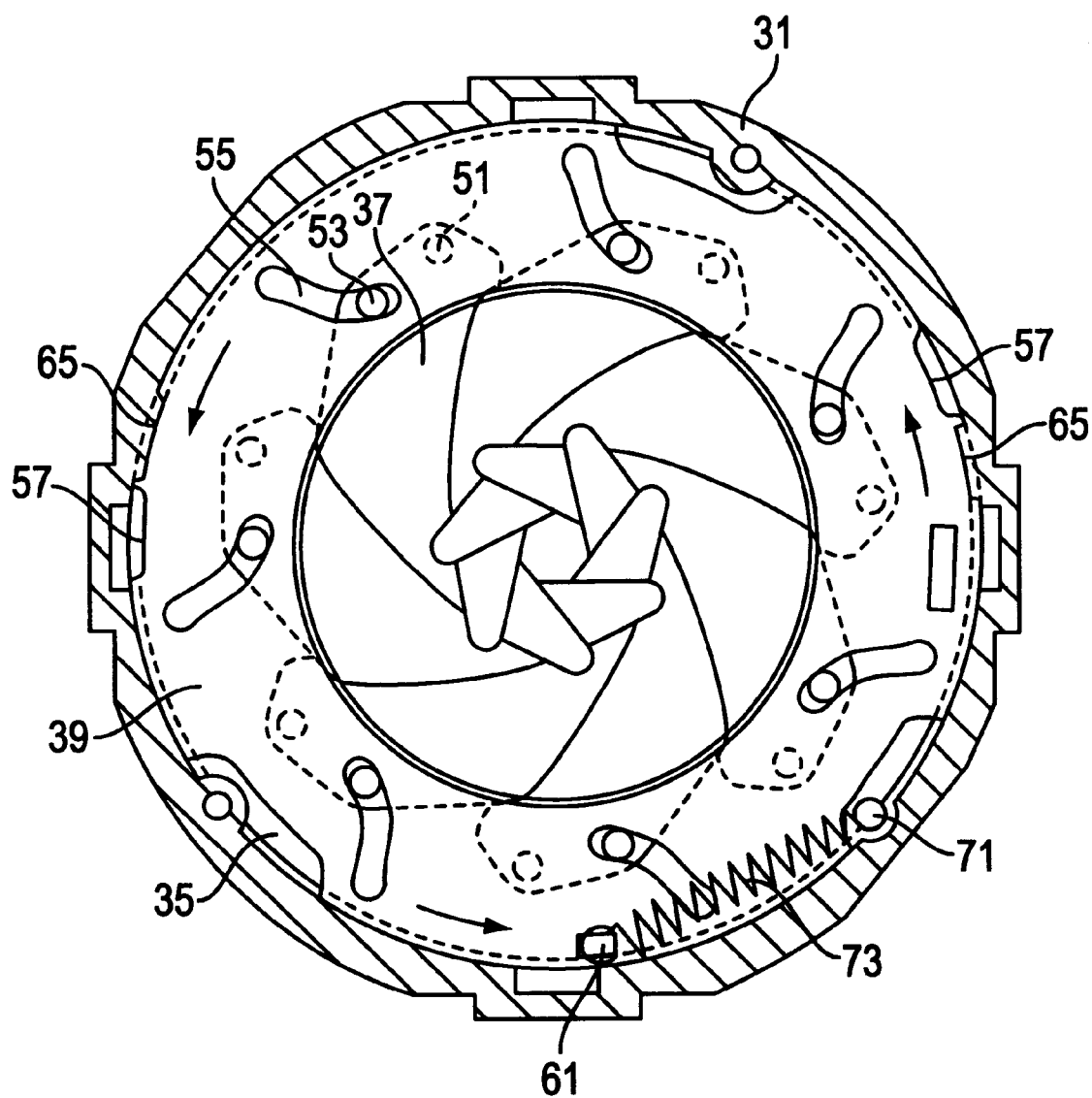
FIG. 6 is a sectional view of the iris stop unit in a closed state taken along the sectional line 5—5 in FIG. 1 in accordance with embodiments of the present invention.

Then, as shown in FIG. 6, a coiled tension spring 73 is stretched between a pin 71 implanted in the support ring 35 and the spring-stop boss 61 of the drive ring 39. The drive ring 39 is rotated counterclockwise by the tension force of the coiled tension spring 73, and the blades 37 pivot on the axis of pivot pins 51 to the minimum aperture position, and at the same time the rotational phase of lugs 65 of the moving tube 31 and that of assembly recesses 57 of the drive ring 39 deviate. As a result, the drive ring 39 is held by the lugs 65, and neither the blades 37 nor the drive ring 39 detach or drop off from the moving tube 31 even when the moving tube 31 is held upside down. The clearance t between the support ring 35 and a lug 65 is set a predetermined amount larger than the sum of the thickness of the blades 37 and the drive ring 39. Thus, the blades 37 and the drive ring 39 are held by the moving tube 31 with a certain play.

The third lens group holding frame 25 is then inserted into the moving tube 31, as shown in FIG. 4, and the third lens group holding frame 25 is connected to the moving tube 31 by screws 75, as shown in FIG. 1. Then, the drive ring 39 is held by the front end of the third lens group holding frame 25, thus completing the assembly of the iris stop unit 41. In this condition, the support ring 35 and the lug 65 are separated by a predetermined distance, and the smooth rotation of the drive ring 39 is not disturbed by the impediment of the lugs 65 and the assembly recesses 57 of the drive ring 39.

As described above, in accordance with embodiments of the present invention, because the iris stop unit 41 is fixed by using the third lens group holding frame 25, the previously required fixing ring is unnecessary and, at the same time, the process time is considerably reduced. Moreover, because the pre-assembly is facilitated by lugs 65 formed inside the moving tube 31, the blades 37 and/or the drive ring 39 will not to drop off while assembling, thus the operation efficiency is much improved.

The present invention is not limited to the embodiments described hereinabove, and various modifications are possible. For example, although embodiments of the present invention have been described as having the support ring 35 of the iris stop unit 41 formed in the moving tube 31, the support ring 35 may be formed, instead, in the fixed tube or may be made as a single separate part. If a special tool is used for assembling, pre-assembly of blades and the drive ring is not necessarily required.

Although embodiments of the present invention have been described hereinabove as applied to a zoom lens barrel of which the iris stop is driven by the components of the camera body, the present invention may be applied to a zoom lens barrel, in which, by adding an aperture ring in the barrel, the iris stop can be driven manually. Further, the present invention may be applied to a single-focal-length lens barrel. The actual components of an iris stop unit are not limited to the above-described embodiments, and various other designs may be suitably substituted. For example, a cam lobe may be fitted on the drive ring instead of a cam groove.

The lens barrel in accordance with embodiments of the present invention comprises an iris stop unit including a support ring, blades arranged behind the support ring in a freely pivotable manner, and a drive ring arranged behind the blades to freely pivot the blades. Because the blades and drive ring are secured to the support ring by the lens group holding frame in a manner to assure intended motions, the fixing ring or screws become unnecessary, and, at the same time, it becomes unnecessary to cut female screws and bore threaded holes in the support parts for the lens group holding frame. As a result, the product cost and the assembly time are considerably reduced. Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A lens barrel, comprising:
   a support ring;
   a blade arranged behind or in front of the support ring in a freely pivotable manner;
   a drive ring arranged behind or in front of the blade to pivot the blade;
   a lens group holding frame to connect the blade and the drive ring to the support ring; and
   a support tube,
   wherein the support ring is integrally formed with the support tube and the lens group holding frame is connected to the support tube.

2. A lens barrel as recited in claim 1, wherein the support ring and the drive ring are coupled and cannot be separated from each other except when arranged at a relative angle.

3. A lens barrel as recited in claim 2, further comprising an impetus device to provide an impetus to the drive ring in a direction deviated from the relative angle.

4. A lens barrel, comprising:
   a lens group support frame;
   a support tube; and
   an iris stop unit connected directly to the lens group support frame to secure the iris stop unit in the lens barrel, the iris stop unit comprising,
      a support ring,
      a freely pivotable blade attached to the support ring, and
      a drive ring held by the lens group support frame,
   wherein the support ring is formed integrally with the support tube, and the drive ring is coupled to the support ring.

5. A lens barrel as recited in claim 4, wherein the support ring and the drive ring are coupled and cannot be separated from each other except when arranged at a relative angle.

6. A lens barrel as recited in claim 5, further comprising an impetus device to provide an impetus to the drive ring in a direction deviated from the relative angle.

7. A lens barrel as recited in claim 4, wherein the support tube is a moving tube.

8. A lens barrel as recited in claim 4, wherein the support tube is a fixed tube.

9. A lens barrel as recited in claim 4, wherein the support tube includes a lug and the drive ring includes a recess, and the drive ring is held by the lug when the lug and recess are not aligned such that the drive ring can not be detached from the support tube.

10. A lens barrel as recited in claim 9, wherein the drive ring is detachable from the support tube when the lug and recess are aligned.

11. A lens barrel as recited in claim 9, further comprising a device to provide a force to the drive ring to cause the recess to deviate from the alignment with the lug.

12. A lens barrel as recited in claim 9, wherein a clearance exists between the lug and the support ring, the clearance being a predetermined amount larger than a sum of a thickness of the blade and the drive ring.

13. A method of assembling an iris in a lens barrel, comprising:
   inserting a drive ring having a recess into a support tube having a lug with the rotational phase of the recess in phase with the lug;
   rotating the drive ring to deviate the rotational phase of the recess and drive ring to secure the drive ring to the support tube.

14. A method as recited in claim 13, further comprising:
   inserting a lens group holding frame into the support tube; and
   securing the lens group holding frame to the support tube to hold the drive ring with an end of the lens group holding frame.

15. A lens barrel, comprising:
   a support ring;
   a blade arranged behind or in front of the support ring in a freely pivotable manner;
   a drive ring arranged behind or in front of the blade to pivot the blade; and
   a lens group holding frame to connect the blade and the drive ring to the support ring,
   wherein the support ring and the drive ring are coupled and cannot be separated from each other except when arranged at a relative angle.

16. A lens barrel as recited in claim 15, further comprising an impetus device to provide an impetus to the drive ring in a direction deviated from the relative angle.

* * * * *